United States Patent
Zimmerman et al.

(10) Patent No.: US 9,054,409 B2
(45) Date of Patent: Jun. 9, 2015

(54) SYSTEMS FOR POSITIONING REFLECTORS, SUCH AS PASSIVE REFLECTORS

(75) Inventors: Kurt Zimmerman, Indialantic, FL (US); Robert Meehan, Melbourne, FL (US); Mark Mannarino, Melbourne, FL (US); Courtney D. Miller, Rockledge, FL (US)

(73) Assignee: Harris Corporation, Melbourne, FL (US)

( * ) Notice: Subject to any disclaimer, the term of this patent is extended or adjusted under 35 U.S.C. 154(b) by 779 days.

(21) Appl. No.: 13/188,216

(22) Filed: Jul. 21, 2011

(65) Prior Publication Data

US 2013/0021214 A1 Jan. 24, 2013

(51) Int. Cl.
*H01Q 3/08* (2006.01)
*H01Q 3/20* (2006.01)
*G02B 7/198* (2006.01)
*H01Q 1/12* (2006.01)

(52) U.S. Cl.
CPC . *H01Q 3/08* (2013.01); *H01Q 3/20* (2013.01); *G02B 7/198* (2013.01); *H01Q 1/125* (2013.01)

(58) Field of Classification Search
CPC ............. H01Q 3/08; H01Q 1/18; G02B 7/198
USPC ...................... 343/757–75, 761; 359/811, 873
See application file for complete search history.

(56) References Cited

U.S. PATENT DOCUMENTS

| | | | |
|---|---|---|---|
| 1,344,289 A | 6/1920 | Case | |
| 1,692,466 A | 11/1928 | Pflueger et al. | |
| 1,841,234 A | 1/1932 | Thorpe | |
| 2,407,310 A | 9/1946 | Lundy | |
| 2,537,822 A | 1/1951 | Fritts | |
| 2,557,967 A | 6/1951 | Hudson et al. | |
| 2,599,381 A | 6/1952 | Gerks | |
| 2,916,739 A | 12/1959 | Falstrom | |
| 3,980,252 A | 9/1976 | Tae | |
| 4,772,410 A | 9/1988 | Sato | |
| 6,188,300 B1 * | 2/2001 | Rodeffer | 333/261 |
| 6,911,950 B2 * | 6/2005 | Harron | 343/766 |
| 7,463,206 B1 | 12/2008 | Kyhle | |
| 2003/0112194 A1 * | 6/2003 | Watson | 343/757 |

FOREIGN PATENT DOCUMENTS

EP 2549585 1/2013

OTHER PUBLICATIONS

European Search Report mailed Nov. 15, 2012; Application Serial No. 12005036.4-2220 in the name of Harris Corporation.

(Continued)

*Primary Examiner* — Sue A Purvis
*Assistant Examiner* — Amal Patel
(74) *Attorney, Agent, or Firm* — Robert J. Sacco, Esq.; Fox Rothschild LLP

(57) ABSTRACT

Systems are provided for positioning passive reflectors, such a lens/mirror assemblies, and other types of reflectors that need to be pointed in a particular direction. The systems can effectuate control of both the elevation and azimuth angles of the reflector. The systems can be configured so that a mount can rotate so as to vary the azimuth angle of the reflector by 360° or more without a need to reverse the direction of rotation of the reflector, and without the use of slip rings, RF rotary joints, or electrical cable wraps.

15 Claims, 15 Drawing Sheets

(56) References Cited

OTHER PUBLICATIONS

Information about Related Patents and Patent Applications, see section 6 of the accompanying Information Disclosure Statement Letter, which concerns Related Patents and Patent Applications. (Jan. 27, 2015).

International Search Report and Written Opinion mailed Oct. 31, 2014 in Application PCT/US2014/049397.

* cited by examiner

SYSTEMS FOR POSITIONING REFLECTORS, SUCH AS PASSIVE REFLECTORS

BACKGROUND OF THE INVENTION

1. Statement of the Technical Field

The inventive arrangements relate to systems for positioning or pointing reflectors that require mechanical positioning on a dynamic or moving basis. Such reflectors can include, for example, passive reflectors such as lens/mirror assemblies that are used to focus and direct energy to and from sensors used in applications such as satellite communications and optical sensing.

2. Description of the Related Art

Directive sensors, i.e., sensors whose functionality is dependent upon the relative orientation thereof, are often used in applications that require hemispherical pointing and focusing of the energy being directed to or from the sensor, hereinafter referred to as "the sensor beam." A passive reflector in the form of a lens and an attached minor, hereinafter referred to collectively as a lens/mirror assembly, can be used to focus and direct the sensor beam. To effectuate hemispherical pointing of the sensor beam, the lens/mirror assembly needs to be movable so that its azimuth angle, i.e., compass direction, and elevation angle, i.e., the angle above the horizon, can be varied. Hemispherical pointing thus requires that the lens/mirror assembly rotate about at least two axes.

Lens/mirror assemblies, and other types of reflectors that require hemispherical pointing can be mounted on devices that facilitate movement of the lens/mirror assembly about a vertically-oriented axis and a horizontally-oriented axis. For example, the lens/mirror assembly can be suspended from a yoke or other type of mount that permits the lens/mirror assembly to pivot about the horizontally-oriented axis. The yoke, in turn, can be mounted on a base or other component that permits the yoke and the lens/mirror assembly to rotate about the vertically-oriented axis.

Components such as electric motors can be used to provide the forces that cause the yoke to rotate about the vertical axis, and the lens/mirror assembly to pivot about the horizontal axis. The azimuth motor, i.e., the motor that causes the yoke to rotate about the vertical axis, can be mounted below the base or turntable of the hemispherical pointing device, on the non-rotating portion of the device. The elevation motor, i.e., the motor that causes the lens/mirror assembly to pivot about the horizontal axis, is typically mounted on the rotating yoke. Power for the motor can be supplied by electric cabling. The use of cabling, however, can prevent the yoke and the lens/mirror assembly from being able to rotate continuously about the vertical axis. In practice, it may be necessary to reverse the direction of rotation of the yoke and the lens/mirror assembly after these components have rotated through a net angular displacement of approximately 200°, to avoid stretching and potentially damaging the cabling. The need to reverse the direction of rotation in this manner can add to the time needed for the system to respond to required changes in the azimuth angle, and can reduce the duty cycle of the motor and other components of the system that effectuate rotation of the mount and the lens/mirror.

Brush-type electrical slip rings can be used to transfer electrical power between the rotating and non-rotating components of a hemispherical pointing device, thereby eliminating the need for cabling to transfer power. Although slip rings can thereby facilitate continuous rotation of the yoke and the lens/mirror assembly about their vertical axes, slip rings typically wear and require replacement at relatively frequent intervals due to the friction inherent in the operation thereof. Slip rings can also be susceptible to the degrading effects of corrosion, particularly in seaborne applications. Moreover, the initial cost of slip rings can be relatively high.

In applications where the sensor is an active element that receives and/or transmits electrical signals and the sensor is mounted the lens/mirror, the signals need to be transferred between the rotating and non-rotating components of the hemispherical pointing device. Such signal transfer can be effectuated using RF rotary joints. The insertion of RF rotary joints in the signal paths, however, can introduce undesirable power losses in the signals.

SUMMARY OF THE INVENTION

Embodiments of the invention concern systems for positioning passive reflectors, such as lens/mirror assemblies, and other types of reflectors that need to be pointed in a particular direction. The systems effectuate control of both the elevation and azimuth angles of the reflector. The embodiments are configured so that a mount can rotate so as to vary the azimuth angle of the reflector by 360° or more without a need to reverse the direction of rotation of the reflector, and without the use of slip rings, RF rotary joints, or electric cable (wrapping).

Embodiments of systems for positioning reflectors can comprise a base, and a mount. The mount can mounted on the base for rotation about a first axis in relation to the base, and is capable of supporting the reflector so that the reflector can rotate about a second axis in relation to the mount. The embodiments also include a linkage comprising at least one rigid arm. The linkage is operable to rotate with the mount about the first axis. The linkage is mechanically coupled to the reflector so that movement of the linkage in relation to the mount imparts rotation to the reflector about the second axis when the reflector is supported by the mount. The linkage is capable of being driven for movement in relation to the mount by a component that remains substantially stationary with respect to rotation about the first axis while the linkage and the mount rotate about the first axis.

Other embodiments of systems for positioning reflectors allow decoupling of the elevation motion of the reflector from the azimuth motion thereof. An elevation motion actuator capable of up and down motion is used in lieu of an elevation motor. The embodiments also include a base, and a mount mounted on the base for rotation about a first axis in relation to the base. The mount is capable of supporting the reflector so that the reflector can rotate about a second axis in relation to the mount. The elevation motion actuator can be mounted on the base so that the elevation motion actuator remains stationary with respect to rotation about the first axis while the mount rotates about the first axis. The embodiments further include a rigid lifting arm actuated for movement by the elevation motion actuator. The lifting arm is mechanically coupled to the reflector so that movement of the lifting arm in relation to the mount imparts rotation to the reflector about the second axis when the reflector is supported by the mount.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

FIGS. 1-8 and 13 depict a system 100 for positioning reflectors such as passive reflectors. The system 100 is described herein in connection with a passive reflector in the form of a lens/mirror assembly 10 comprising a "constant-k" or uniform dielectric lens attached to a reflecting mirror, and which requires continuous 360° motion in azimuth and continuous tilting in elevation. This particular type of reflector is depicted for exemplary purposes only. The system 100 can be used to position other types of reflectors that require mechanical positioning on a moving basis, including but not limited to gradient index (Luneberg) lenses, flat mirrors, etc.

Figure 1:
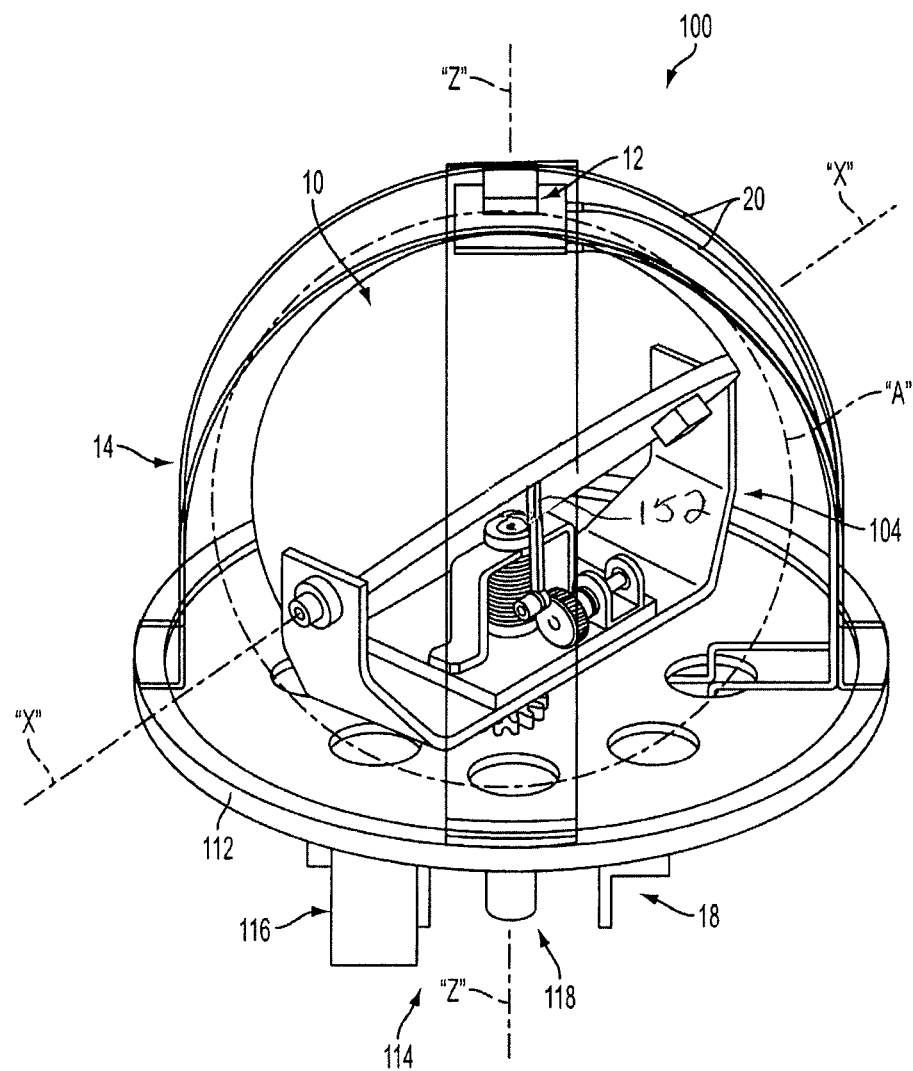
FIG. 1 is a perspective view of a system for positioning reflectors such as lens/mirror assemblies, depicting a radome associated with the system in partial phantom view.
Figure 4:
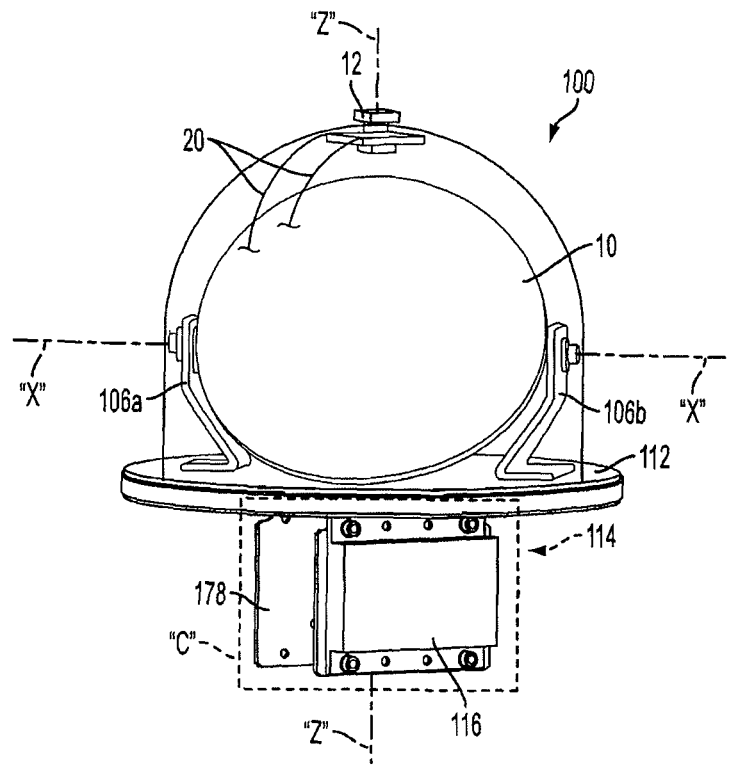
FIG. 4 is a side view of the system shown in FIGS. 1-3, depicting the radome in partial phantom view.

The lens/mirror assembly 10 is part of a patch antenna that also includes a feed 12, i.e., the lens/mirror assembly 10 and feed 12 together form a patch antenna. The lens/mirror assembly 10 is a passive element that focuses and directs radio frequency (RF) signals to and from the active feed 12. In particular, the lens of the lens/mirror assembly 10 enhances and organizes the electromagnetic energy being directed to or from the feed 12, and the mirror redirects the organized energy to its final position. The feed 12 is fixed to a spar in the form of a radome 14. The radome 14 covers the lens/mirror assembly 10 and parts of the system 100 as shown in FIGS. 1 and 4. The feed 12 is positioned on the radome 14 in a center-uppermost or zenith position. The feed 12 radiates inwardly toward the lens/mirror assembly 10. The lens/mirror assembly 10 collimiates the beam emitted by the feed 12, turns the beam outwardly, and points the beam in a desired direction.

The feed 12 can be communicatively coupled to an RF electronics module 18 that receives, generates, and processes the incoming and outgoing signals. The feed 12 and the module 18 can be communicatively coupled via cabling 20 secured to the surface of the radome 14. Since the lens/mirror assembly 10 is passive, and the active feed 12 is positioned on the radome 14, the system 100 does not require RF rotary joints or other means for transmitting electrical signals between rotating and non-rotating components thereof.

The use of the system 100 in connection with a patch antenna is disclosed for exemplary purposes only. The system 100 can be used in connection with other types of devices that require mechanical positioning or pointing of a reflective element, such as camera systems, lighting systems, lasers, and other types of antenna systems including but not limited to helix, dipole, and waveguide horn antenna systems. Moreover, the feed 12 can be mounted on metallic or dielectric spars other than the radome 14 in alternative embodiments.

Figure 2:
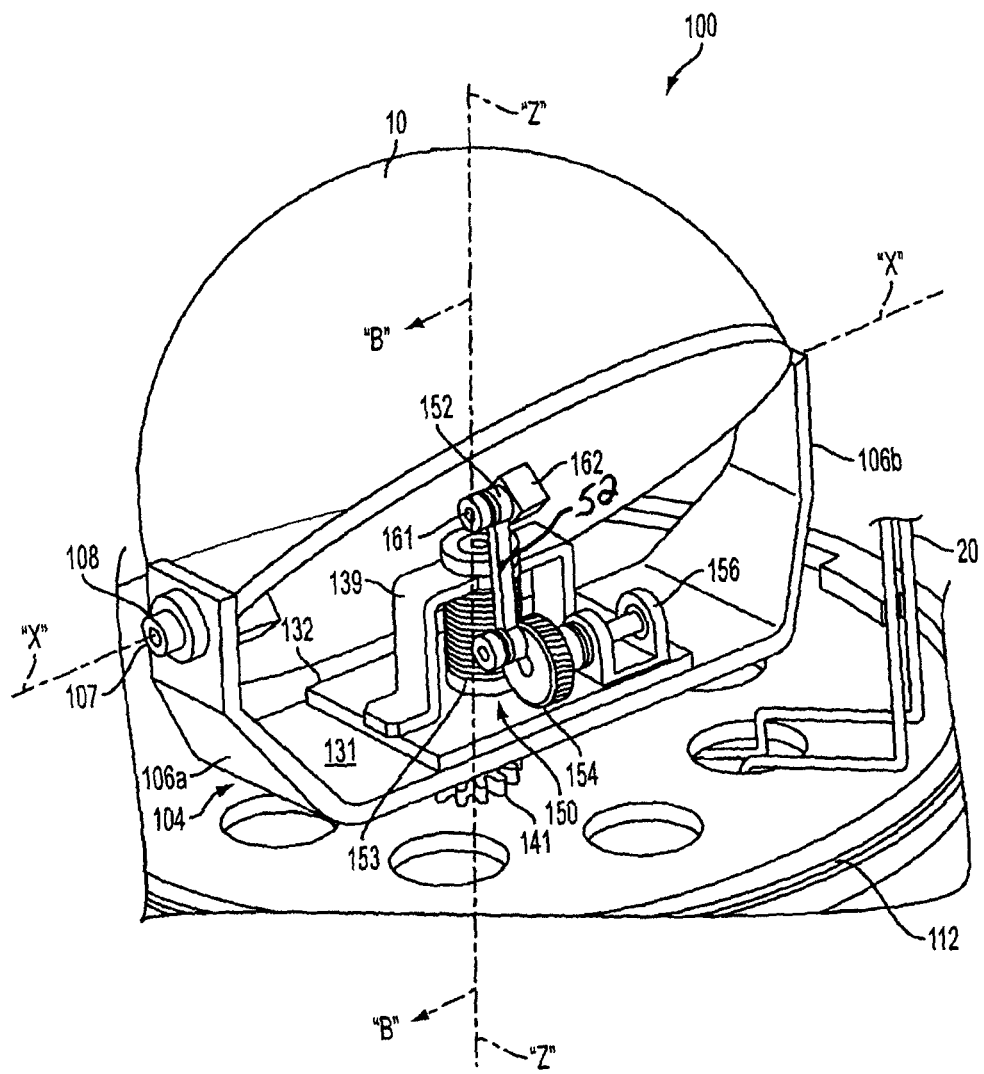
FIG. 2 is a magnified view of the area designated "A" in FIG. 1.

The system 100 comprises a mount in the form of a yoke 104 having a first and second arm 106a, 106b. The lens/mirror assembly 10 is mounted to the yoke 104 via respective shoulder bolts 107 and bearings 108 positioned proximate the ends of first and second arms 106a, 106b, as shown in FIGS. 1, 2, and 4. The bearings 108 permit the lens/mirror assembly 10 to rotate or pivot in relation to the yoke 104, about a horizontally-oriented axis "x" denoted in FIGS. 1, 2, and 4.

The system 100 also includes a base 112. The base 112 can be mounted on the vehicle, airframe, ship, or structure on which the lens/mirror assembly 10 is to be used. The yoke 104 and the lens/mirror assembly 10 are positioned above the base 112, and can rotate in relation to the base 112 about a vertically-oriented axis denoted by the reference character "z" in FIGS. 1-5.

The system 100 further includes a drive unit 114 mounted on an underside of the base 112, as shown in FIGS. 1, 3, 4, and 5. The drive unit 114 comprises a motor control unit 116. The drive unit 114 further comprises an azimuth control motor 118 and an elevation control motor 120 each communicatively coupled to and controlled by the motor control unit 116. The azimuth control motor 118 and the elevation control motor 120 are each capable of bi-directional, i.e., forward and reverse, operation. The azimuth control motor 118 and the elevation control motor 120 can be, for example, 12 or 24-volt direct-current micro-motors. Other types of motors can be used in the alternative. The azimuth control motor 118 can be equipped with an encoder 119, shown in FIGS. 3 and 5, to track the azimuth angle of the lens/mirror assembly 10. The elevation control motor 120 can be equipped with an encoder 122, shown in FIG. 5, to track the elevation angle of the lens/mirror assembly 10.

Figure 3:
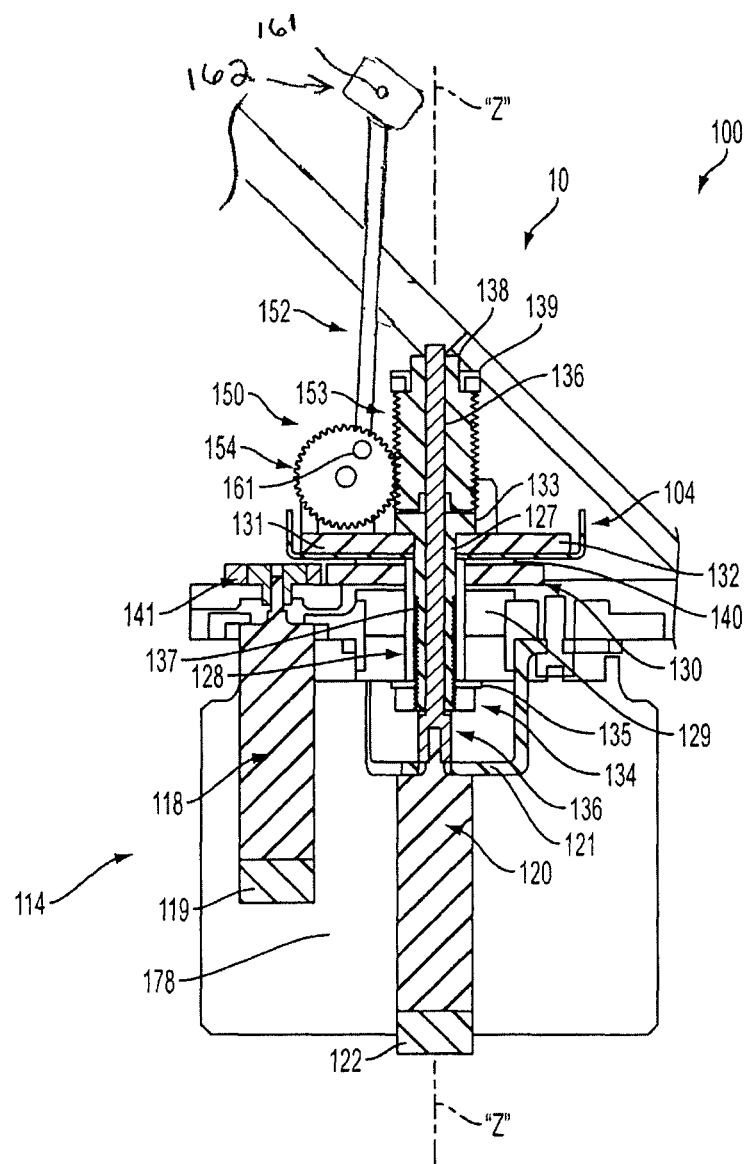
FIG. 3 is a cross-sectional view of the system shown in FIGS. 1 and 2, taken through the line "B-B" of FIG. 2.
Figure 5:
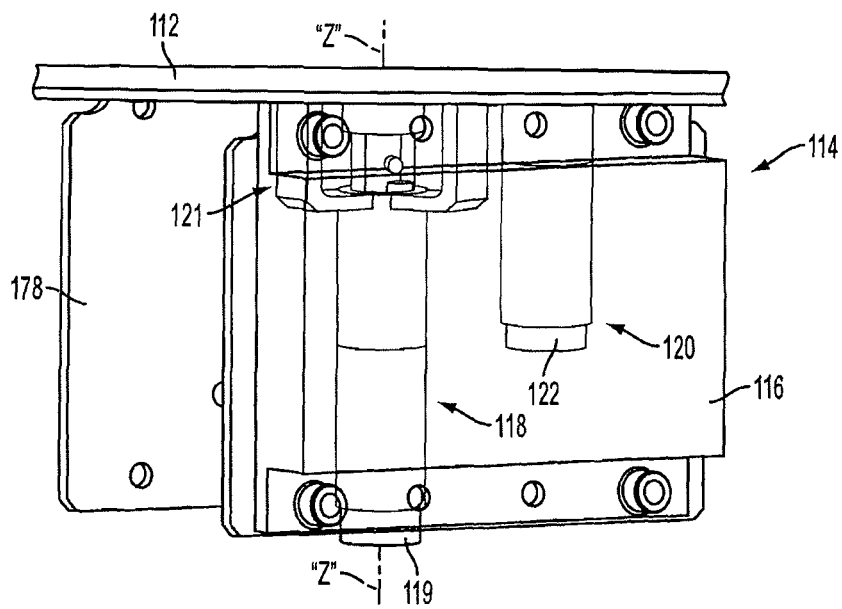
FIG. 5 is a magnified view of the area designated "C" in FIG. 4.
Figure 6:
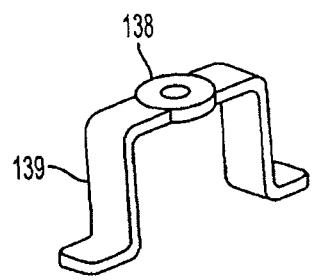
FIG. 6 is a perspective view a bracket and flange for stabilizing a worm screw of the system shown in FIGS. 1-5.
Figure 7:
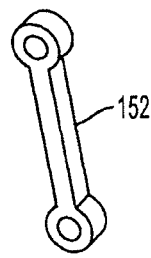
FIG. 7 is a perspective view a crank arm of the system shown in FIGS. 1-6.
Figure 8:
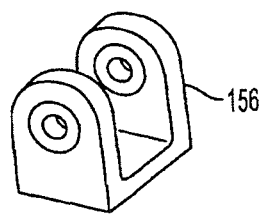
FIG. 8 is a perspective view a bracket for mounting a gear of the system shown in FIGS. 1-7.

The azimuth control motor 118 is offset from the center of the base 112 as shown in FIG. 3. The azimuth control motor 118 can be suspended from the underside of the base 112 using bolts or other suitable means. The elevation control motor 120 is located directly below the center of the base 112, and can be suspended from a bracket 121, as shown in FIGS. 3 and 5. The bracket 121 can be suspended from the base 112 using bolts or other suitable means.

The motor control unit 116 is mounted on a bracket 178. The bracket 178 can be suspended from the underside of the base 112 using bolts or other suitable means, as shown in FIGS. 3 and 5. The RF electronics module 18 can also be mounted on the bracket 178.

Figure 10:
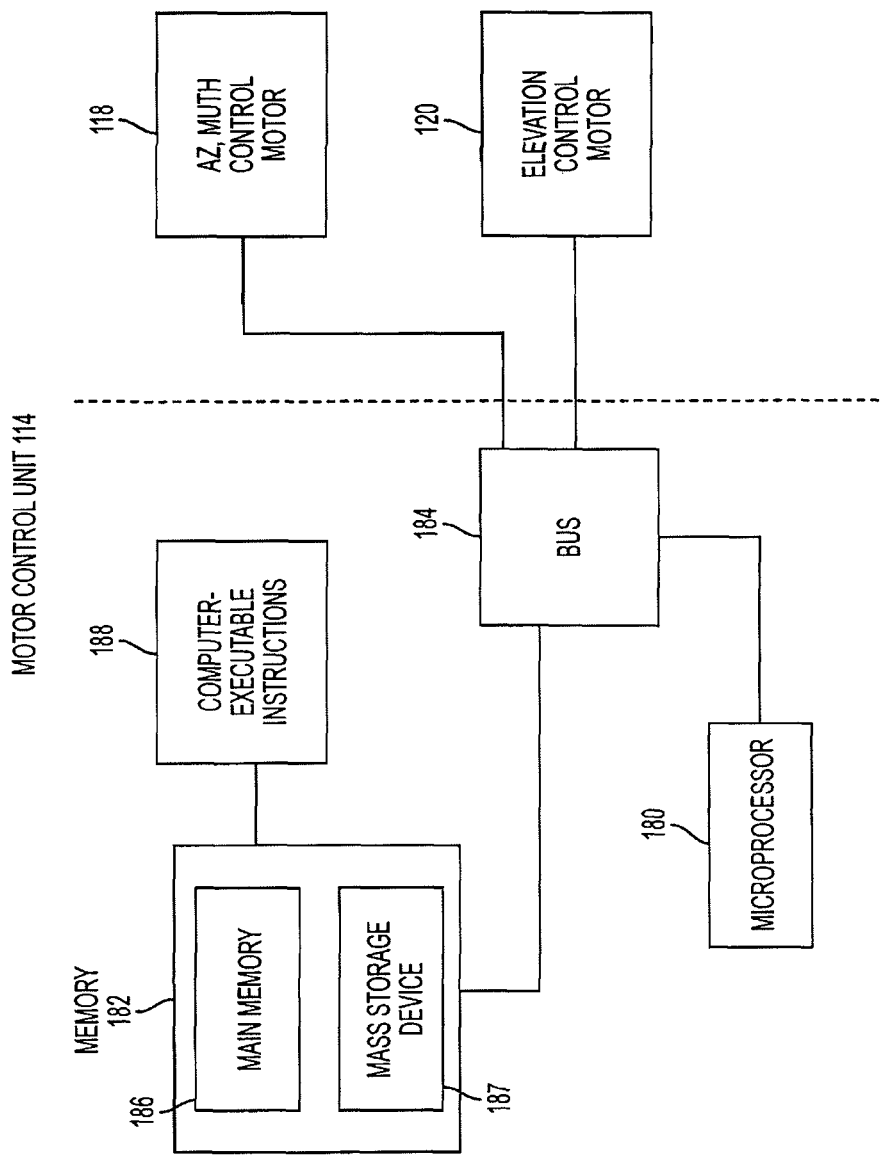
FIG. 10 is a block diagram depicting electronic components of the system shown in FIGS. 1-8.
Figure 11:
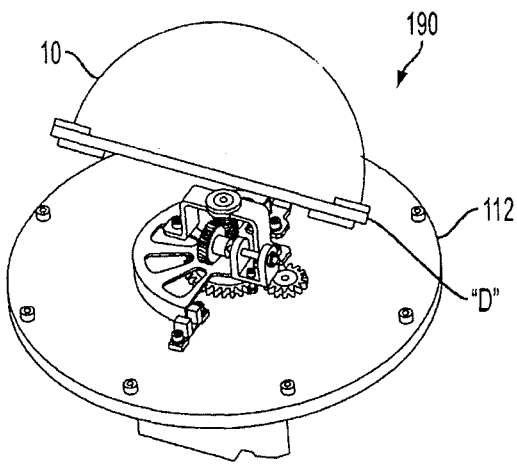
FIG. 11 is a perspective view of an alternative embodiment of the system shown in FIGS. 1-8 and 10.

The motor control unit 116 includes a processor such as a microprocessor 180, a memory 182, and a bus 184, shown in FIG. 10. The bus 184 facilitates communication between the microprocessor 180 and the memory 182, the azimuth control motor 118, the elevation control motor 120, and other components of the system 100.

The memory 182 can comprise a main memory 186 and a mass storage device 187, each of which is communicatively coupled to the microprocessor 180 by way of the bus 184. The main memory 186 can be, for example, random access memory. The mass storage device 187 can be, for example, a hard or optical disk.

Figure 13:
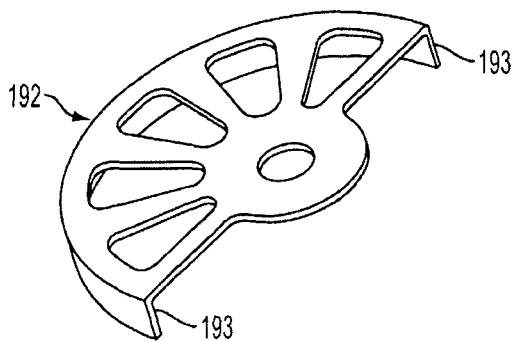
FIG. 13 is a perspective view of a bracket of the system shown in FIGS. 11 and 12.

The motor control unit 116 can also include computer-executable instructions 188 stored on the memory 182, as shown in FIG. 13. The computer-executable instructions 188, when executed on the microprocessor 180, cause the microprocessor 180 to generate control inputs for the azimuth control motor 118 and the elevation control motor 120. The control inputs cause the selective activation and deactivation of the azimuth control motor 118 and the elevation control motor 120 in a manner that controls the azimuth and elevation angles of the lens/mirror assembly 10, so as to properly position the lens/mirror assembly 10 for a particular operating condition.

The yoke 104 is mounted for rotation on the base 12 by way of a bolt 127, a bushing 128, two bearings 129, and a gear 130, as shown in FIG. 3. The bearings 129 can be, for example, single-row ball bearings, radial four-point contact (Type-X) ball bearings, a double-row angular contact ball bearing, or bushings. The bearings 129 are concentrically disposed around the bushing 128. The inner race of each bearing 129 can be secured to the bushing 128 by an interference fit or other suitable means.

The bushing 128 is concentrically disposed around the bolt 127. The gear 130 is concentrically disposed around an upper portion of the bushing 128, and is secured to the bushing 128 using by interference fit or other suitable means. A ring-shaped spacer 140 can be positioned between the gear 130 and the underside of the center portion 131 of the yoke 104.

The bearings 129 are located in a through hole formed at the center of the base 112. The outer race of each bearing 129 engages the base 112 along a periphery of the through hole as shown in FIG. 3, so that the bearings 129 are secured to the base 112 in the axial, i.e., vertical, direction.

The bushing 128 and a shaft 137 of the bolt 127 extend through the through hole. The shaft 137 of the bolt 127 also extends through a through hole formed in a center portion 131 of the yoke 104, and through a mounting plate 132 located on the center portion 131, as shown in FIG. 3.

A head 133 of the bolt 127 rests on the mounting plate 132. The bolt 127 and the bushing 128 can be secured to the yoke 104 through the use of a nut 134 and a washer 135, depicted in FIG. 3. The nut 134 engages threads on the lower portion of the shaft 137 of the bolt 127. Tightening of the nut 134 urges the washer 135 against the bottom of the bushing 128, which in turn urges the bushing 128 upward, into the bottom of the center portion 131 of the yoke 104. The resulting reactive forces cause the head 133 of the bolt 127 to be urged downward, into the mounting plate 132. The sandwiching of the center portion 131 of the yoke 104 between the bushing 128 and the head 133 of the bolt 127 causes the yoke 104 to rotate about the "z" axis with the bolt 127, the bushing 128, and the inner races of the bearings 129.

The system 100 also includes a drive shaft 136. A portion of the drive shaft 136 is disposed concentrically within the bolt 127, as shown in FIG. 3. A bore is formed within the bolt 127 to accommodate the drive shaft 136. The bore is sized so that a clearance exists between the drive shaft 136 and the bolt 127, thereby facilitating rotation of the drive shaft 136 in relation to the bolt 127.

The elevation control motor 120 is mounted below the drive shaft 136 as shown in FIG. 3, and is coupled to the drive shaft 136 so that activation of the elevation control motor 120 causes the drive shaft 136 to rotate. The term "coupled," as used herein, is intended to denote both direct and indirect connections between two or more parts or components. An upper end of the drive shaft 136 is laterally restrained by a flange bushing 138 mounted on a bracket 139. The flange 138 and bracket 139 are depicted separately in FIG. 7. The bracket 139 is mounted on the mounting plate 132 on the center portion 131 of the yoke 104, as shown in FIGS. 1-3.

The azimuth control motor 118 is mechanically coupled to the gear 130 via a spur gear 141, shown in FIG. 3. A shaft of the spur gear 141 extends through a through hole formed in the base 112. The shaft is mechanically coupled to the azimuth control motor 118 so that the azimuth control motor 118, when activated, causes the spur gear 136 to rotate. The spur gear 136, in turn, exerts a torque on the gear 130. Because the gear 130 is secured to the bushing 128, the torque generated by the azimuth control motor 118 and exerted on the gear 130 is transferred to the yoke 104 via the busing 128, and thereby causes the yoke 104 and the lens/mirror assembly 10 to rotate about the vertically-oriented "z" axis.

Thus, it can be seen that the torque generated by the azimuth control motor 118 causes the spur gear 136 to rotate, which in turn causes the gear 130 and the bushing 128 to rotate about the vertically-oriented "z" axis. Because the yoke 104 and the lens/mirror assembly 10 are mounted so as to rotate with the bushing 128, the activation of the azimuth control motor causes the yoke 104 and the lens/mirror assembly 10 to rotate about the "z" axis.

Rotation of the lens/mirror assembly 10 about the "z" axis varies the azimuth angle of the lens/mirror assembly 10. Thus, the azimuth angle of the lens/mirror assembly 10 can be controlled by selectively activating and deactivating the azimuth control motor 118 using inputs generated by the microprocessor 180 of the motor control unit 116.

The above details relating to the manner in which the yoke 104 is mounted and rotated are disclosed for exemplary purposes only. The yoke 104 can be mounted and rotated using other means in alternative embodiments. For example, drive belts can be used in lieu of the above-described gearing to drive the yoke 104 for rotation about the "z" axis.

As discussed below, the configuration of the system 100 obviates any need to supply electrical power between the base 112 and the components of the system 100, such as the yoke 104, that rotate in relation to the base 112. Thus, there is no need for cabling or slip rings to transfer electrical power between the rotating and non-rotating components of the system 100. This feature permits the yoke 104 and the lens/mirror assembly 10 to rotate continuously about the "z" axis, and thus permits the azimuth angle of the lens/mirror assembly 10 to be varied by 360° or more without having to reverse the direction of rotation of the lens/mirror assembly 10.

The system 100 further includes a worm gear-set 150, and a linkage in the form of a rocker or crank arm 152 for varying the elevation angle of the lens/mirror assembly 10. The arm 152 is depicted separately in FIG. 7. The gear-set 150 includes a screw or worm 153, shown in FIGS. 1-3. The worm 153 is securely mounted on an upper end of the drive shaft 136 by an interference fit or other suitable means, so that the worm 153 rotates with the drive shaft 136.

The gear-set 150 also comprises a gear 154 mounted for rotation on a mount 156. The mount 156 is depicted separately in FIG. 8. The mount 156 is secured to the mounting plate 132 on the center portion 131 of the yoke 104. The mount 156 can include bushings that receive a shaft of the gear 154, so that the shaft and the remainder of the gear 154 can rotate in relation to the mount 156. The gear 154 engages the worm 153. Rotation of the drive shaft 136 by the elevation control motor 120 imparts rotation to the worm 153, which in turn imparts rotation to the gear 154.

A first end of the arm 152 is pivotally coupled to the gear 154 via a shoulder pin 161 as shown in FIGS. 1-3, so that rotation of the gear 154 imparts movement to the first end of the arm 152. A second end of the arm 152 is pivotally coupled to a flange 162 positioned on a underside of lens/mirror assembly 10, via another shoulder pin 161. The arm 152 thus functions as a linkage that transmits the force exerted by the gear 154 on the arm 152 to the lens/mirror assembly 10. This force, in combination with the restraining forces exerted on the lens/mirror assembly 10 by the yoke 104 via the bearings 108, cause the lens/mirror assembly 10 to rotate about the horizontal axis "x" in response to rotation of the gear 154.

Thus, it can be seen that the torque generated by the elevation control motor 120 causes the drive shaft 136 to rotate, which in turn rotates the worm 153. The worm 153 rotates the gear 154, which in turn moves arm 152 in a manner that causes the lens/mirror assembly 10 to pivot or rotate about the horizontal "x" axis.

Rotation of the lens/mirror assembly 10 about the "x" axis varies the elevation angle of the lens/mirror assembly 10. Thus, the elevation angle of the lens/mirror assembly 10 can be controlled by selectively activating and deactivating the elevation control motor 120 using inputs generated by the microprocessor 180 of the motor control unit 116. The elevation angle can be varied by, for example, approximately plus or minus 45°. This degree of variation, in combination with the azimuth-angle control effectuated by the system 10, facilitates hemispherical coverage for the lens/mirror assembly 10 and the antenna 12.

The start and end points for the rotational motion of the lens/mirror assembly 10 about the horizontal "x" axis be changed by, for example, varying the length of the arm 152, and/or varying the location on the underside of lens/mirror assembly 10 at which the flange 162 is mounted. Moreover, the system 10 can be configured so that the start and end points can be adjusted after assembly. For example, a turnbuckle with left and right-hand threads can be incorporated into variants of the arm 152, or elsewhere within linkage between the gear 154 and the flange 162, to alter the start and end points.

Because the elevation control motor 120 is mounted on the base 112, rather than on the yoke 104 or another component that rotates in relation to the base 112, there is no need to supply electrical power between the base 112, and the yoke 104 or other rotating components. This feature, as discussed above, permits the yoke 104 and the lens/mirror assembly 10 to rotate continuously about the "z" axis without the use of slip rings or other means for transferring electrical power between rotating and non-rotating components.

Due to the inherent mechanical characteristics of worm gears, the worm gear-set 150 cannot be back driven, i.e., the gear 154 cannot cause the worm 153 to rotate. Thus, the loads on the lens/mirror assembly 10 do not need to balanced about the axis of rotation "x," since unbalance about this axis will not cause back-drive of the worm 153, drive shaft 136, or elevation control motor 120, although balancing is recommended in applications where continuous high-speed rotation of the yoke 104 and the lens/mirror assembly 10 about the "z" axis is anticipated.

Moreover, as a result of the configuration of the system 100, the position of the lens/mirror assembly 10 will not be locked or frozen if the elevation drive motor 120 fails, i.e., the lens/mirror assembly 10 can still be rotated about vertical "z" axis following a failure of the elevation drive motor 120.

Moreover, the computer-executable instructions 188 of the motor control unit 116 can be configured so as to effectuate control the elevation angle of the lens/mirror assembly 10 after a failure of the elevation control motor 120. In particular, the elevation angle of the lens/mirror assembly 10 can be varied without activating the elevation control motor 120, by rotating the yoke 104 about the "z" axis using the azimuth control motor 118. Rotating the yoke 104 while the elevation control motor 120 is inactive will cause the gear 154 of the worm gear set 150 to orbit about the worm 153, which is stationary because the elevation drive motor 120 is inactive. The orbital motion of the gear 154 about the worm 153 causes the worm 153 to impart rotation to the gear 154. Rotation of the gear 154 imparts a force to the arm 152, which in turn varies the elevation angle of the lens/mirror assembly 10. Thus, a desired elevation angle for the lens/mirror assembly 10 can be achieved by rotating the yoke 104 while the elevation control motor 120 is inactive and the worm 153 is stationary. The amount of rotation required to produce a desired elevation angle is dependent upon the difference between the actual and desired elevation angles. It may be necessary under some circumstances to rotate the yoke 104 through multiple revolutions to achieve the desired elevation angle.

Figure 9:
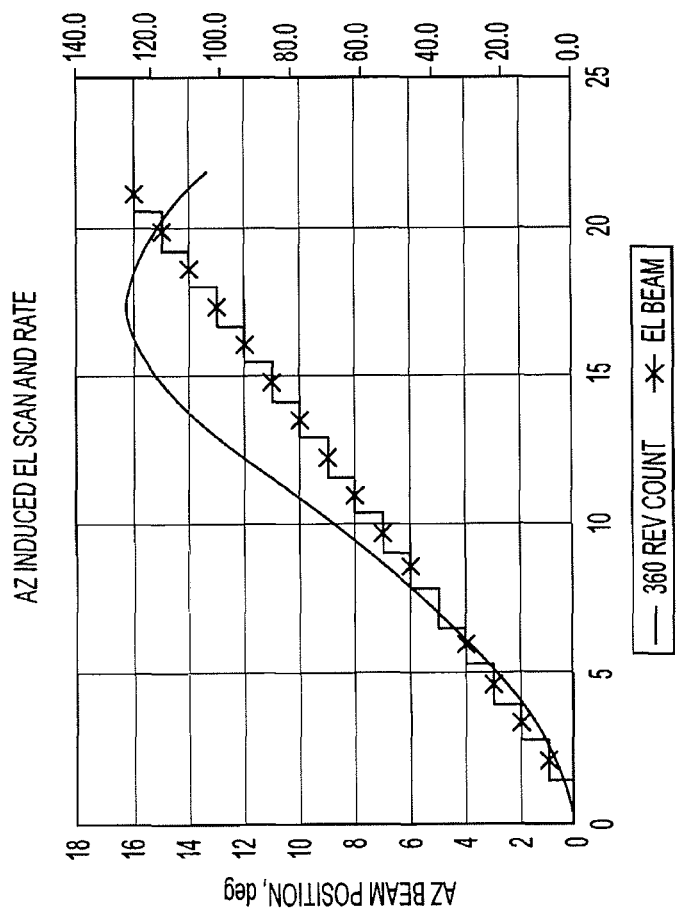
FIG. 9 is a graphical representation of a simulation of the change in lens elevation angle vs. number of rotations of the lens about a vertically-oriented axis for the system shown in FIGS. 1-8.

For example, FIG. 9 depicts the results of a simulation showing the change in the elevation angle of the lens/mirror assembly 10 as a function of the number of revolutions of the lens/mirror assembly 10 about the vertically-oriented "z" axis. This information indicates that, when the lens/mirror assembly 10 and the yoke 104 are rotated about the "z" axis sixteen times, the elevation angle of the lens/mirror assembly 10 moves passively, i.e., without any assistance from the elevation control motor 120, by approximately 7.5° per revolution.

The computer-executable instructions 188 of the motor control unit 116 can be configured to recognize a failure of the elevation control motor 120, and other circumstances that would prevent the control of the elevation angle through the use of the elevation control motor 120. The computer-executable instructions 188, in conjunction with the microprocessor 180, can effectuate elevation-angle control in a back up mode under such circumstances, by generating control inputs that cause the azimuth control motor 118 to rotate the yoke 104 in the appropriate direction until the desired elevation angle is achieved.

Alternative embodiments of the system 10 can be configured without the elevation control motor 120 and the drive shaft 136. Control of the elevation angle of the lens/mirror assembly 10 can be effectuated solely by rotating the yoke 104 about the worm 153 or a similar structure, using the azimuth control motor 118 in the above-described manner. This embodiment can thus provide hemispherical pointing of the lens/mirror assembly 10 using a single motor.

FIGS. 11-14 depict an alternative embodiment of the system 100 in the form of a system 190. The system 190 can include features that permit the motor control unit 114 to recognize when the azimuth and elevation angles of the lens/mirror assembly 10 are in a reference or home position at power-up, or when the position data available through the encoder 119 on the azimuth control motor 118 has been lost or is otherwise unavailable due to corruption or other factors. Components of the system 190 that are identical or substantially identical to those of the system 100 are denoted in the figures by identical reference characters.

Figure 12:
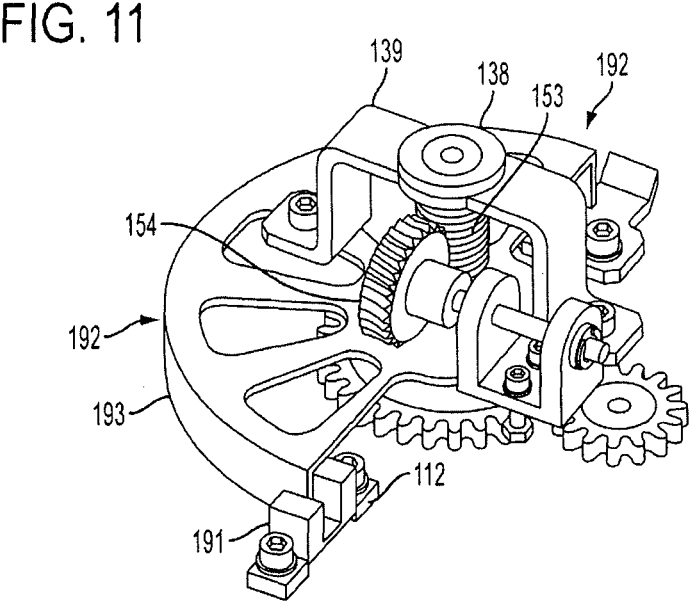
FIG. 12 is a magnified view of the area designated "D" in FIG. 11.
Figure 14:
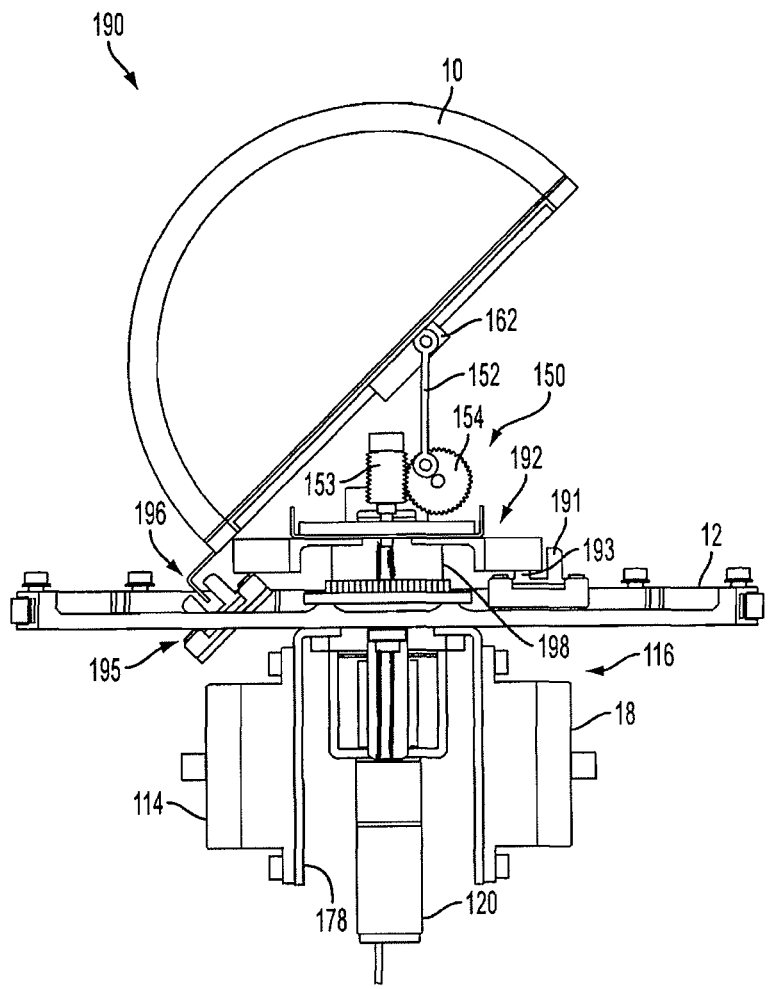
FIG. 14 is a side view of the system shown in FIGS. 11-13, depicting the lens/mirror assembly at a maximum elevation angle.

The system 190 can include a sensor 191 communicatively coupled to the motor control unit 116, and a sensor bracket 192. The azimuth sensor 191 can be mounted on the base 112, as shown in FIGS. 12 and 14. The sensor 191 can be mounted on shims. The shims can be formed as layered or laminated structures in which one or more of the layers can be peeled off to facilitate adjustment of the height of the sensor 191. The height of the sensors 191 can be adjusted using other suitable means in the alternative. The sensor bracket 192 is mounted for rotation with the yoke 104. In particular, the sensor bracket 192 can be sandwiched between a bushing 198 and the bottom of the center portion 131 of the yoke 104 as shown in FIGS. 12 and 14, so that the sensor bracket 192 rotates with the yoke 104.

The sensor bracket 192 has a lip 193. The sensor 191 is positioned so that the lip 193 passes through the sensor 191 as the bracket 192 rotates with the yoke 104 about the vertically-oriented axis "z" axis, as shown in FIGS. 12 and 14. A unique magnetic or optical marking, recognizable by the sensor 191, can be placed on the lip 193. The computer-executable instructions 188 can be programmed to recognize the point at which the marking aligns with the sensor 191 as indicative that the azimuth angle of the lens/mirror assembly 10 has reached a home or reference position.

At power-up or other conditions where the absolute value for the azimuth angle is not known, the computer-executable instructions 188 can be programmed to activate the azimuth control motor 118 so as to rotate to yoke 104 and the sensor bracket 192 until the sensor 191 recognizes that is it aligned it the marking, thereby indicating that the lens/mirror assembly 10 has reached its home or reference position with respect to azimuth angle. The motor control unit 114 can at this point begin tracking the azimuth angle of the lens/mirror assembly 10 in relation to the reference position based on the output of the encoder 119.

The system 190 can also include an elevation sensor 195, shown in FIG. 14. The elevation sensor 195 is mounted on the lens/mirror assembly 10 by way of a bracket 196 attached to an outer edge of the lens/mirror assembly 10. The elevation sensor 195 can be mounted on the bracket 196 using peelable shims to facilitate adjustment of the height of the sensor 195. The height of the elevation sensor 195 can be adjusted using other suitable means in the alternative. The elevation sensor 195 is an inclinometer that generates an output signal representative of the deviation in the orientation of the lens/mirror assembly 10 from its a horizontal position. The elevation sensor 195 can be communicatively coupled to the motor control unit 116. The computer-executable instructions 188 can include code that, when executed by the microprocessor 180, cause the microprocessor 180 to recognize the elevation angle of the lens/mirror assembly 10 based on the output signal of the sensor 195.

If necessary in a particular application, a slot (not shown) can be formed in the base 112 of the system 190 to prevent interference between the elevation sensor 195 and the base 112 when the lens/mirror assembly 10 is tilted at or near its maximum in relation to the "y" axis as shown in FIG. 14.

At power-up or other conditions where the absolute value for the elevation angle of the lens/mirror assembly 10 is not known based the output of the encoder 122, the computer-executable instructions 188 can be programmed to activate the elevation control motor 120 so as to rotate to gear-set 150 until the elevation sensor 195 recognizes that the lens/mirror assembly 10 has achieved a level position with respect to the horizon, i.e., zero tilt angle around the "x" axis, thereby indicating that the lens/mirror assembly 10 is at a reference or home position with respect to elevation angle. In the above-noted single-motor embodiment in which the elevation angle is varied solely by rotating the gear 154 around the worm 153, the azimuth control motor 118 can be activated to effectuate such rotation until the lens/mirror assembly 10 achieves a level position with respect to the horizon The motor control unit 114 can at this point begin tracking the elevation angle of the lens/mirror assembly 10 in relation to the reference position based on the output of the encoder 122.

FIGS. 15-18 depict another alternative embodiment of the system 100 in the form of a system 200. Components of the system 200 that are identical or substantially identical to those of the system 100 are denoted in the figures by identical reference characters.

Figure 15:
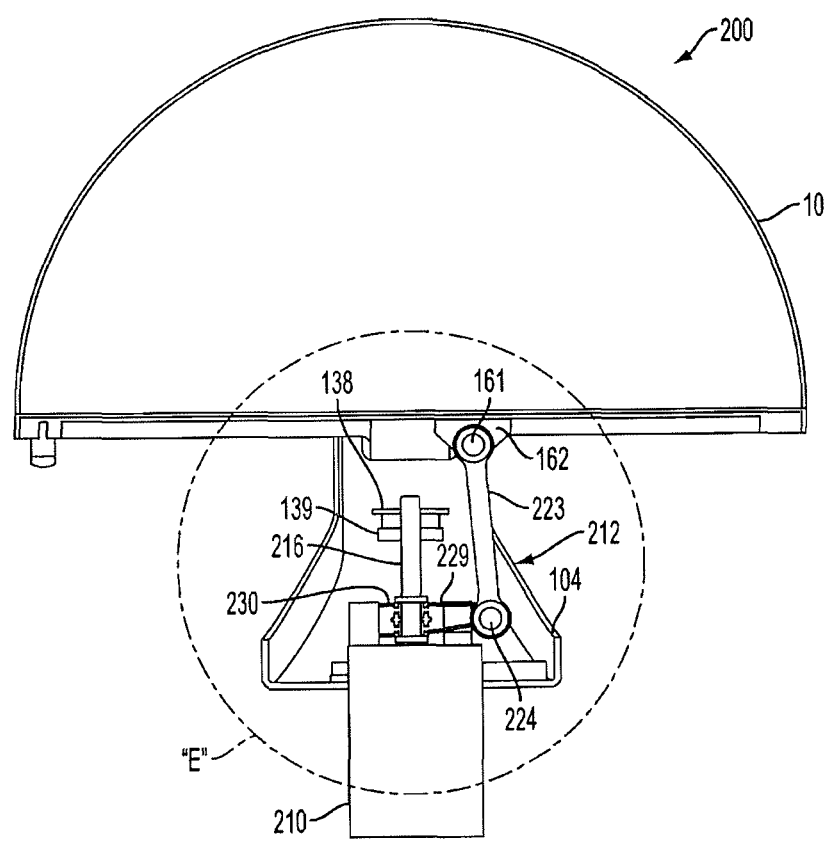
FIG. 15 is a side view of another alternative embodiment of the system shown in FIGS. 1-8 and 10, depicting the elevation actuator stroke at its lowest position.

The system 200 facilitates control of the azimuth angle of the lens/mirror assembly 10 in the same manner, and using substantially the same components as in the system 100. Elevation control is effectuated by the system 200 using an electrically-driven push-pull actuator 210, and a mechanical linkage 212 driven by the actuator 210. The actuator 210 is mounted on an underside of the base 112, as shown in FIG. 15, and is communicatively coupled to the microprocessor 180 of the motor control unit 116. An output rod or shaft 216 of the actuator 210 extends through the bolt 127. The bolt 127 and shaft 216 extend through a through hole located at the approximate center of the base 112. The shaft 216 also extends through the center portion 130 of the yoke 104. The actuator 210 can include a proportional solenoid, linear motor, or a motor-driven ball screw, lead screw, or ACME screw assembly to effectuate the push-pull (up and down) motion of the shaft 216, denoted by the arrow 221 in FIG. 17.

The linkage 212 comprises a rocker arm 223 and a lift tab 229. The arm 223 is mechanically coupled to the actuator 210 via the lift tab 229, and a bearing 230 positioned around the shaft 216 of the actuator 210. In particular, a first end of the lift tab 229 is pivotally coupled to a first end of the arm 223 by a shoulder pin 224. A second end of the lift tab 229 is pressed onto or otherwise secured to an outer race of the bearing 230. An inner race of the bearing 230 is pressed onto or otherwise secured to the shaft 216 so that the bearing 230, lift tab 229, and arm 223 move up and down with the shaft 216. This arrangement permits the arm 223 to rotate about the shaft 216 in relation to the vertically-oriented "z" axis. An upper end of the shaft 216 can be laterally restrained by a suitable means such as the flange bushing 138 and bracket 139 described above in relation to the system 100.

Figure 16:
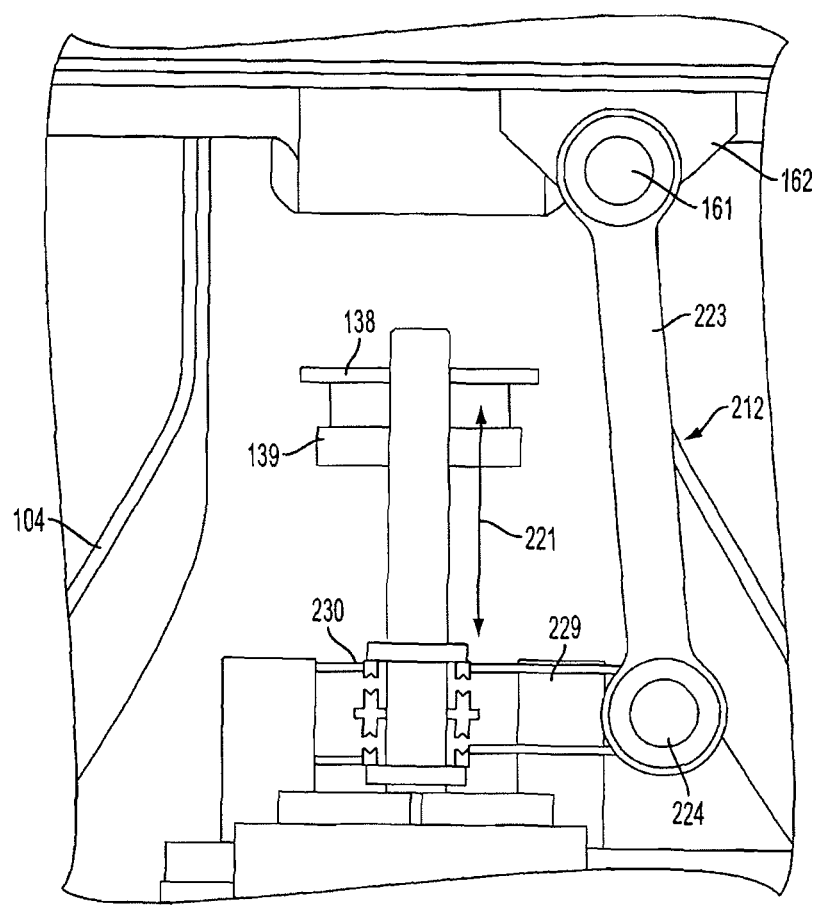
FIG. 16 is a magnified view of the area designated "E" in FIG. 15.
Figure 17:
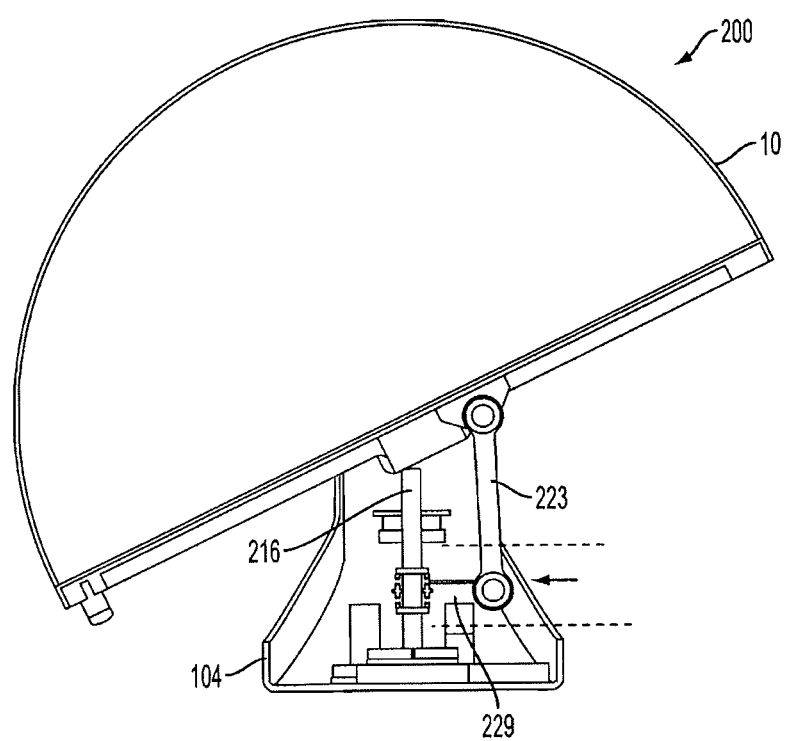
FIG. 17 is a side view of the system shown in FIGS. 15 and 16, depicting the elevation actuator stroke at an intermediate position within its range of vertical stroke.
Figure 18:
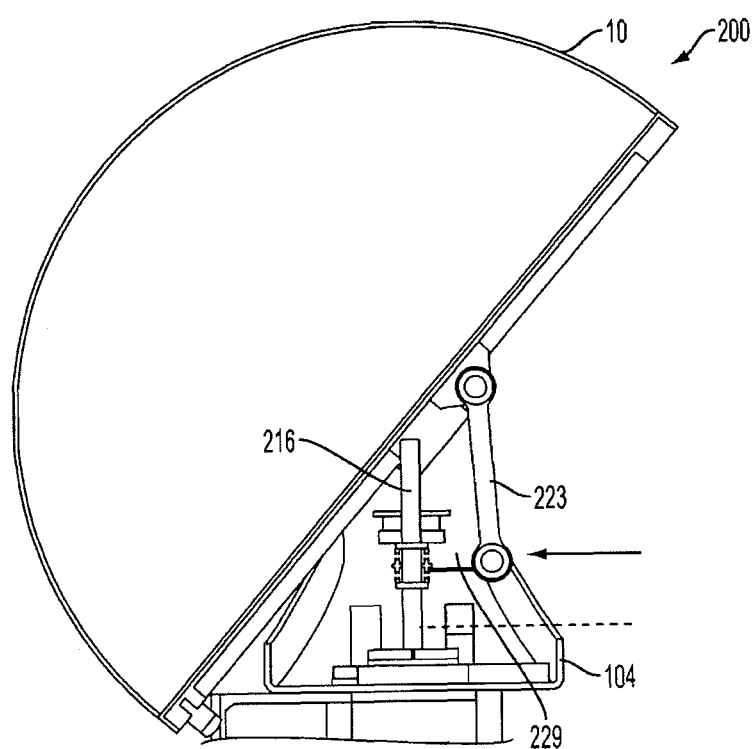
FIG. 18 is a side view of the system shown in FIGS. 15-17, depicting the elevation actuator stroke at its highest position.

A second end of the arm 223 is pivotally coupled to a flange 162 positioned on a underside of lens/mirror assembly 10, via a shoulder pin 161 as shown in FIGS. 16 and 17. The arm 223 thus functions as a linkage that transmits the force exerted by the actuator 210 to the lens/mirror assembly 10. This force, in combination with the restraining forces exerted on the lens/mirror assembly 10 by the yoke 104 via the bearings 108, cause the lens/mirror assembly 10 to rotate about the horizontal axis "x" in response to movement of the shaft 216 of the actuator 210. For example, FIGS. 15 and 16 depict the arm 223 and lift tab 229 in a lowermost position which causes the lens/mirror assembly 10 to assume an elevation angle of, for example, approximately 90°. FIG. 17 depicts the arm 223 and lift tab 229 in an intermediate position which causes the lens/mirror assembly 10 to assume an elevation angle of, for example, approximately 67°. FIG. 18 depicts the arm 223 and lift tab 229 in a highest position which causes the lens/mirror assembly 10 to assume an elevation angle of, for example, approximately 45°.

The start and end points for the rotational motion of the lens/mirror assembly 10 about the horizontal "x" axis be changed by, for example, varying the length of the lift tab 229, varying the stroke of the actuator 210, and/or varying the location on the underside of lens/mirror assembly 10 at which the flange 162 is mounted. Moreover, the system 200 can be configured so that the start and end points can be adjusted after assembly. For example, a turnbuckle with left and right-hand threads can be incorporated into variants of the lift tab 229, or elsewhere within linkage 212, to alter the start and end points.

The azimuth and elevation angles of the lens/mirror assembly 10 are uncoupled, i.e., can be varied independently of each other. Thus, control of the azimuth angle can still be effectuated in the event the actuator 210 fails. Moreover, due to the inherent mechanical characteristics of the actuator 210, the linkage 212 cannot be back driven. Thus, the loads on the lens/mirror assembly 10 do not need to balanced about the axis of rotation "x," since unbalance about this axis will not cause back-drive of the linkage 212 of actuator 210. The elevation angle of the lens/mirror assembly 10 can be determined using a linear extensometer that senses movement between the shaft 216 of the actuator 210 and the remainder of the actuator 210.

Figure 19:
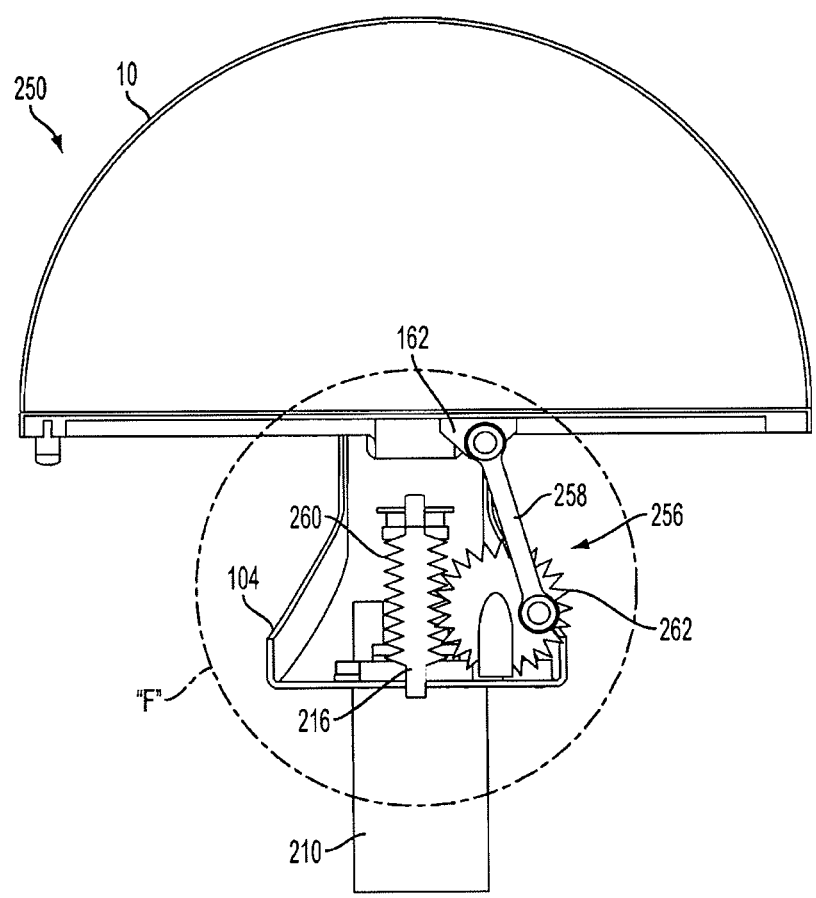
FIG. 19 is a side view of another alternative embodiment of the system shown in FIGS. 1-8 and 10.
Figure 20:
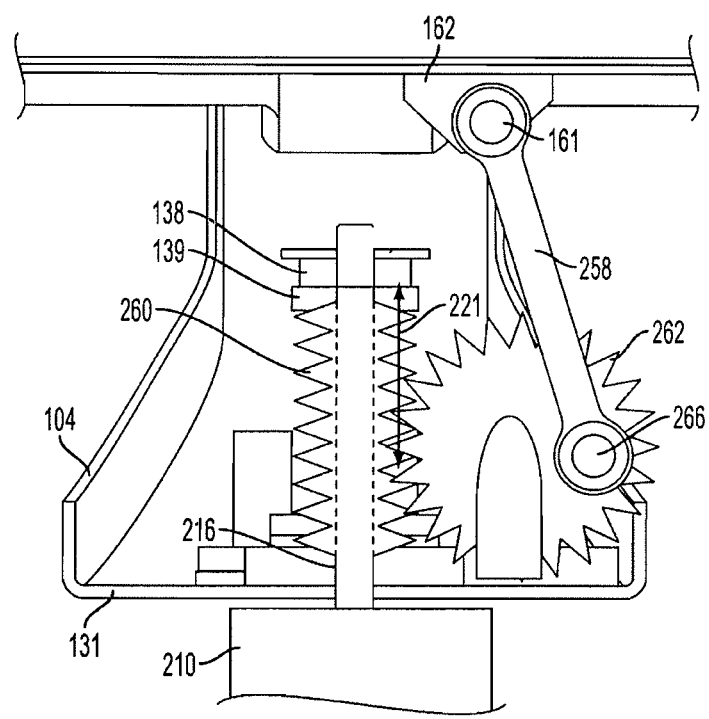
FIG. 20 is a magnified view of the area designated "F" in FIG. 19.

FIGS. 19 and 20 depict another alternative embodiment of the system 100 in the form of a system 250. Components of the system 250 that are identical or substantially identical to those of the systems 100 and 200 are denoted in the figures by identical reference characters.

The system 250 facilitates control of the azimuth angle of the lens/mirror assembly 10 in the same manner, and using substantially the same components as in the systems 100 and 250. Elevation control is effectuated by the system 250 using the electrically-driven push-pull actuator 210 described above in relation to the system 200, a mechanical linkage driven by the actuator 210, and a worm gear-set 256.

The linkage comprises a rocker arm 258. The gear-set 256 includes a screw or worm 260. The worm 260 is securely mounted on an upper end of the shaft 216 of the actuator 210 by an interference fit or other suitable means, so that the worm 260 translates upwardly and downwardly with the shaft 260. Because the worm 260 is secured to the shaft 216, the worm 260 does not rotate in relation to the actuator 210 or base 112.

The gear-set 256 also comprises a gear 262 mounted for rotation on a mount 264. The mount 264 is secured to the center portion 131 of the yoke 104. The mount 264 can include bushings that receive a shaft of the gear 262, so that the shaft and the remainder of the gear 262 can rotate in relation to the mount 264. The gear 262 engages the worm 260, so that vertical movement of the shaft 216 in response to activation of the actuator 210 causes the gear 262 to rotate on its mount 264.

A first end of the arm 258 is pivotally coupled to the gear 262 by a shoulder pin 266. A second end of the arm 258 is pivotally coupled to a flange 162 positioned on a underside of lens/mirror assembly 10, via a shoulder pin 161, so that rotation of the gear 262 in response to the up-down movement of the shaft 216 imparts movement to the first end of the arm 258. The arm 258 thus functions as a linkage that transmits the force exerted by the actuator 210 to the lens/mirror assembly 10. This force, in combination with the restraining forces exerted on the lens/mirror assembly 10 by the yoke 104 via the bearings 108, cause the lens/mirror assembly 10 to rotate about the horizontal axis "x" in response to movement of the shaft 216 of the actuator 210.

The teeth of the worm 260 have a pitch of approximately zero. Thus, rotation of the gear 262 about the worm 260 as the yoke 104 is rotated to change the azimuth angle of the lens/mirror assembly 10 doe not result in rotation of the gear 262 in relation to its mount 264. As a result of this arrangement, the azimuth and elevation angles of the lens/mirror assembly 10 are uncoupled. Control of the azimuth angle, therefore, can still be effectuated in the event the actuator 210 fails. Moreover, due to the inherent mechanical characteristics of the actuator 210, the linkage 212 cannot be back driven. Thus, the loads on the lens/mirror assembly 10 do not need to balanced about the axis of rotation "x," since unbalance about this axis will not cause back-drive of the linkage 212 of actuator 210.

The start and end points for the rotational motion of the lens/mirror assembly 10 about the horizontal "x" axis be changed by, for example, varying the diameter of the gear 262, varying the stroke of the actuator 210, and/or varying the location on the underside of lens/mirror assembly 10 at which the flange 162 is mounted. Moreover, the system 250 can be configured so that the start and end points can be adjusted after assembly. For example, a turnbuckle with left and right-hand threads can be incorporated into variants of the rocker arm 258, or elsewhere within the linkage between the gear 262 and the flange 162, to alter the start and end points.

We claim:

1. A system, comprising:
   a feed;
   a reflector;
   a base;
   a mount mounted on the base for rotation about a first axis in relation to the base and being capable of supporting the reflector so that the reflector can rotate about a second axis in relation to the mount; and
   a linkage comprising at least one rigid arm, wherein:
      the linkage is operable to rotate with the mount about the first axis;
      the linkage having a first end mechanically coupled to the reflector so as to be offset a pre-defined distance from said first axis and so that vertical movement of the rigid arm in relation to the mount imparts rotation to the reflector about the second axis when the reflector is supported by the mount;
      an electro-mechanical drive component mounted on the base so as to have a center axis vertically aligned with said first axis and configured to exclusively drive the linkage for vertical movement in relation to the mount, wherein the electro-mechanical drive component comprises a drive shaft movable in relation to said first axis independent from any rotation about the first axis by the linkage; and a worm-gear set comprising a worm coupled to and rotatable with the drive shaft, and a gear pivotally coupled to a second end opposed from the first end of the linkage and engaging the worm such that rotation of the worm imparts rotation of the gear which causes the vertical movement of the rigid arm;

wherein said feed is positioned on a non-rotating component of said system.

2. The system of claim 1, further comprising a first motor mounted on the base and mechanically coupled to the mount so that the first motor is operable to impart rotation to the mount about the first axis.

3. The system of claim 1, further comprising a means for determining when one of both of an elevation angle and an azimuth angle of the lens has reached a reference position.

4. The system of claim 1, wherein the linkage further comprises a means for adjusting start and end points of the rotation of the mount about the first axis in relation to the base.

5. A system, comprising:
a feed;
a reflector;
a base;
a mount mounted on the base for rotation about a first axis in relation to the base and being capable of supporting the reflector so that the reflector can rotate about a second axis in relation to the mount;
a linkage comprising at least one rigid arm, wherein:
the linkage is operable to rotate with the mount about the first axis;
the linkage is mechanically coupled to the reflector so as to be offset a pre-defined distance from said first axis and so that vertical movement of the rigid arm in relation to the mount imparts rotation to the reflector about the second axis when the reflector is supported by the mount; and
an electro-mechanical drive component mounted on the base so as to have a center axis vertically aligned with said first axis and configured to exclusively drive the linkage for vertical movement in relation to the mount, wherein the electro-mechanical drive component comprises a drive shaft movable in relation to said first axis independent from any rotation about the first axis by the linkage;
a first motor mounted on the base and mechanically coupled to the mount so that the first motor is operable to impart rotation to the mount about the first axis; and
a worm gear-set that drives the linkage for movement in relation to the reflector, the worm gear-set comprising a worm, and a gear that engages the worm so that relative movement between the worm and the gear imparts rotation to the gear;
wherein said feed is positioned on a non-rotating component of said system; and
wherein a first end of the arm is mechanically coupled to the reflector, and a second end of the arm is mechanically coupled to the gear so that the rotation of the gear imparts movement to the arm in relation to the mount.

6. The system of claim 5, further comprising a second motor mounted on the base and coupled to the drive shaft, wherein:
the drive shaft is mechanically coupled to the second motor so that the second motor is operable to impart rotation to the drive shaft;
the drive shaft is mechanically coupled to the worm so that rotation of the drive shaft imparts rotation to the worm;
rotation of the worm imparts rotation to the gear of the worm-gear set; and wherein the electro-mechanical drive component comprises the second motor.

7. The system of claim 6, further comprising
a bushing,
a gear concentrically disposed around the bushing,
a bolt concentrically disposed within the bushing and concentrically disposed around the drive shaft, and
an angular contact bearing concentrically disposed around the bushing and having an outer race that engages the base,
wherein the bolt and the bushing are mechanically coupled to the mount so that the mount rotates about the first axis with the bolt and the bushing, and
wherein the gear is mechanically coupled to the fist motor so that the first motor drives the mount for rotation about the first axis by way of the gear, the bushing, and the bolt.

8. The system of claim 6, wherein the first and second motors are mounted on an underside of the base.

9. A system, comprising:
a feed;
a reflector;
a base;
a mount mounted on the base for rotation about a first axis in relation to the base and being capable of supporting the reflector so that the reflector can rotate about a second axis in relation to the mount;
a linkage comprising at least one rigid arm, wherein:
the linkage is operable to rotate with the mount about the first axis;
the linkage is mechanically coupled to the reflector so as to be offset a pre-defined distance from said first axis and so that vertical movement of the rigid arm in relation to the mount imparts rotation to the reflector about the second axis when the reflector is supported by the mount; and
an electro-mechanical drive component mounted on the base so as to have a center axis vertically aligned with said first axis and configured to exclusively drive the linkage for vertical movement in relation to the mount, wherein the electro-mechanical drive component comprises a drive shaft movable in relation to said first axis independent from any rotation about the first axis by the linkage; and
a first motor mounted on the base and mechanically coupled to the mount so that the first motor is operable to impart rotation to the mount about the first axis;
wherein said feed is positioned on a non-rotating component of said system
wherein the electro-mechanical drive component comprises an actuator comprising the drive shaft capable of reciprocating movement; and
wherein:
the system further comprises a bearing having an inner race secured to the drive shaft so that the bearing reciprocates with the drive shaft;
the linkage comprises an arm and a lift tab;
the lift tab is mechanically coupled to an outer race of the bearing so that the reciprocating movement of the bearing imparts corresponding movement to the lift tab, and the lift tab can rotate in relation to the drive shaft;
a first end of the arm is mechanically coupled to the reflector; and
a second end of the rigid arm is pivotally coupled to the lift tab.

10. A system, comprising:
a feed;

a reflector;
a base;
a mount mounted on the base for rotation about a first axis in relation to the base and being capable of supporting the reflector so that the reflector can rotate about a second axis in relation to the mount; and
a linkage comprising at least one rigid arm, wherein:
the linkage is operable to rotate with the mount about the first axis;
the linkage is mechanically coupled to the reflector so as to be offset a pre-defined distance from said first axis and so that vertical movement of the rigid arm in relation to the mount imparts rotation to the reflector about the second axis when the reflector is supported by the mount; and
an electro-mechanical drive component mounted on the base so as to have a center axis vertically aligned with said first axis and configured to exclusively drive the linkage for vertical movement in relation to the mount, wherein the electro-mechanical drive component comprises a drive shaft movable in relation to said first axis independent from any rotation about the first axis by the linkage; and
a first motor mounted on the base and mechanically coupled to the mount so that the first motor is operable to impart rotation to the mount about the first axis;
wherein said feed is positioned on a non-rotating component of said system;
wherein the electro-mechanical drive component comprises an actuator comprising the drive shaft capable of reciprocating movement; and
wherein:
the linkage comprises an arm having a first end mechanically coupled to the reflector;
the system further comprises a gear-set comprising a worm and a gear that engages the worm;
a second end of the arm is piviotally coupled to the gear;
the worm is mounted on the drive shaft so that the worm reciprocates with the drive shaft;
the reciprocating movement of the worm causes the gear to rotate; and
the rotation of the gear imparts movement to the arm.

11. A system, comprising:
a feed;
a reflector;
a base;
a mount mounted on the base for rotation about a first axis in relation to the base and being capable of supporting the reflector so that the reflector can rotate about a second axis in relation to the mount;
one of a first motor and an actuator mounted on the base so that (1) a center axis thereof is aligned with the first axis about which the mount rotates and (2) the first motor or the actuator remains substantially stationary with respect to rotation about the first axis while the mount rotates about the first axis;
a rigid arm actuated exclusively for vertical movement in relation to the mount by the first motor or the actuator and having a first end mechanically coupled to the reflector so as to be offset a pre-defined distance from said first axis and so that vertical movement of the rigid arm in relation to the mount imparts rotation to the reflector about the second axis when the reflector is supported by the mount; and
a worm-gear set comprising a worm coupled to and rotatable with one of the first motor and the actuator, and a gear pivotally coupled to a second end opposed from the first end of the rigid arm and engaging the worm such that rotation of the worm imparts rotation of the gear which causes the vertical movement of the rigid arm
wherein the feed is positioned on a non-rotating component of said system.

12. The system of claim 11, further comprising a second motor mechanically coupled to the mount so that the second motor is operable to impart rotation to the mount about the first axis in relation to the base.

13. The system of claim 11, wherein the reflector is a passive reflector.

14. The system of claim 13, wherein the passive reflector is a lens/mirror assembly.

15. A system, comprising:
a feed;
a reflector;
a base;
a mount mounted on the base for rotation about a first axis in relation to the base and being capable of supporting the reflector so that the reflector can rotate about a second axis in relation to the mount;
one of a first motor and an actuator mounted on the base so that the first motor or the actuator remains substantially stationary with respect to rotation about the first axis while the mount rotates about the first axis;
a rigid arm actuated for movement by the first motor or the actuator and mechanically coupled to the reflector so as to be offset a pre-defined distance from said first axis and so that vertical movement of the rigid arm in relation to the mount imparts rotation to the reflector about the second axis when the reflector is supported by the mount; and
a lift tab and a bearing having an inner race secured to a shaft of the actuator so that the bearing reciprocates with the shaft, where
the lift tab is mechanically coupled to an outer race of the bearing so that the reciprocating movement of the bearing imparts corresponding movement to the lift tab,
the lift tab is operable to rotate in relation to the shaft, and
the rigid arm is pivotally coupled to the lift tab so that the movement of the lift tab imparts movement to the arm in relation to the mount;
wherein the feed is positioned on a non-rotating component of said system.

* * * * *